United States Patent [19]

Allen et al.

[11] Patent Number: 5,542,685
[45] Date of Patent: Aug. 6, 1996

[54] MEMORY DISK CLAMP AND METHOD

[75] Inventors: Ronald Allen, San Jose; Peter S. Bae, Sunnyvale; Robert Tierney, Fremont; Kenneth D. Fukui, San Jose, all of Calif.

[73] Assignee: Komag, Inc.

[21] Appl. No.: 239,171

[22] Filed: May 6, 1994

[51] Int. Cl.$^6$ .................................................. B23B 31/40
[52] U.S. Cl. ..................... 279/2.02; 279/141; 360/99.12
[58] Field of Search ................................ 279/2.02, 2.03, 279/2.04, 141; 360/86, 98.08, 99.05, 99.12; 369/261, 270

[56] References Cited

U.S. PATENT DOCUMENTS

| | | | |
|---|---|---|---|
| 4,787,079 | 11/1988 | Ueno | 369/270 |
| 5,014,143 | 5/1991 | Mori et al. | 360/99.12 |
| 5,056,082 | 10/1991 | Ekhoff | 360/99.05 |
| 5,244,555 | 9/1993 | Allen et al. | 204/192.2 |
| 5,275,424 | 1/1994 | Watanabe | 279/2.03 |
| 5,367,418 | 11/1994 | Chessman et al. | 360/98.08 |

FOREIGN PATENT DOCUMENTS 404278253  10/1992  Japan ...................................... 369/270

*Primary Examiner*—Steven C. Bishop
*Attorney, Agent, or Firm*—Skjerven, Morrill, MacPherson, Franklin & Friel; Thomas S. MacDonald

[57] ABSTRACT

A clamp for a memory disk having a disk aperture bounded by a cylindrical peripheral edge and chamfered peripheral edges includes facing clamp members having chamfered peripheral edges which are parallel to the chamfered edges of the disk aperture. The clamp directs forces to the disk chamfered edges substantially perpendicular to the disk sides thus preventing deformation or cracking of a clamped disk. Preferably, the disk is held between a chamfer on a housing and a chamfer on an expandable collet extending from the housing. A longitudinal movable expander extending through the housing and collet is attached to a pull bar to expand curved segments of the collet to first move the segments particularly the chamfer to a radial position opposite but spaced from a disk chamfered edge, then longitudinally to contact and clamp the disk with a predetermined force.

21 Claims, 3 Drawing Sheets

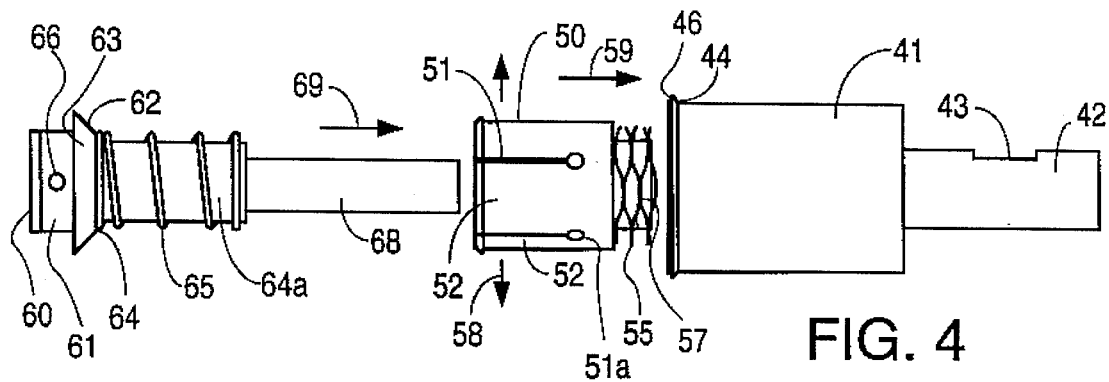
FIG. 4
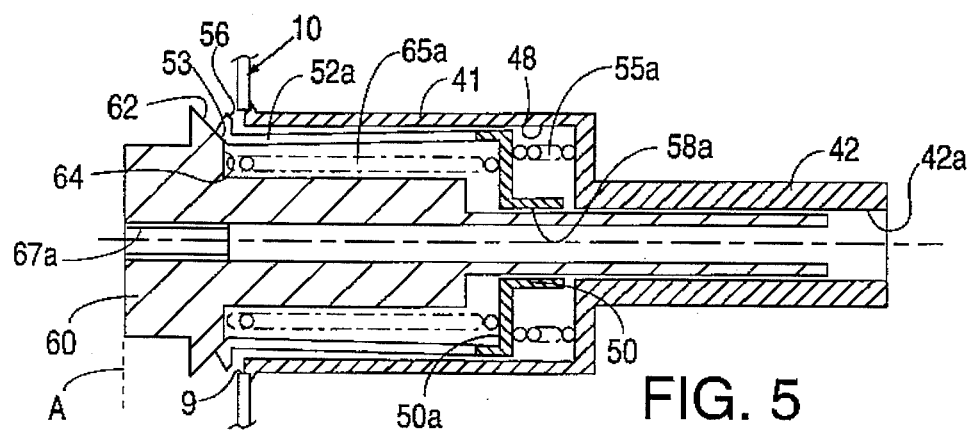
FIG. 5
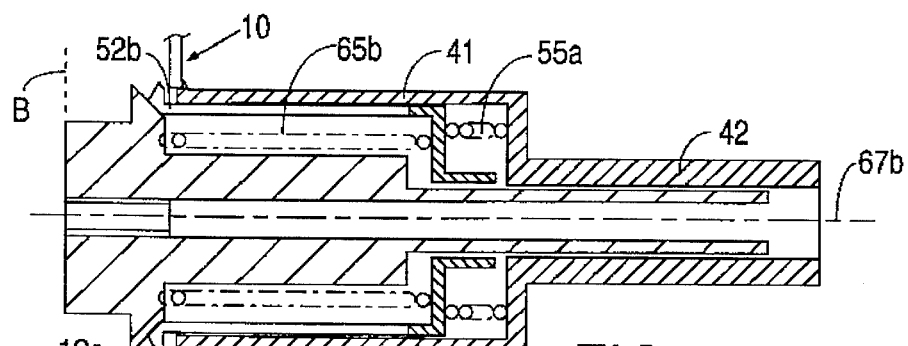
FIG. 6
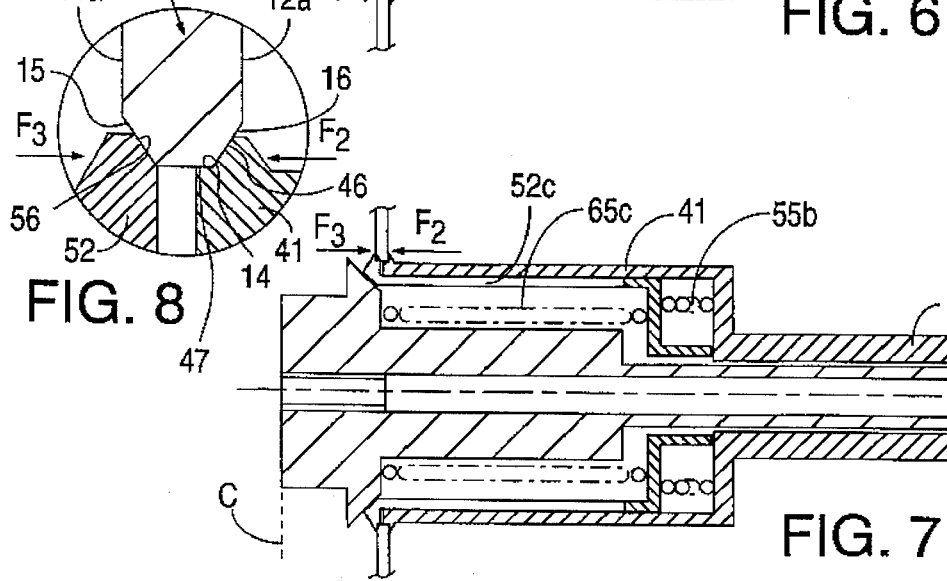
FIG. 8
FIG. 7

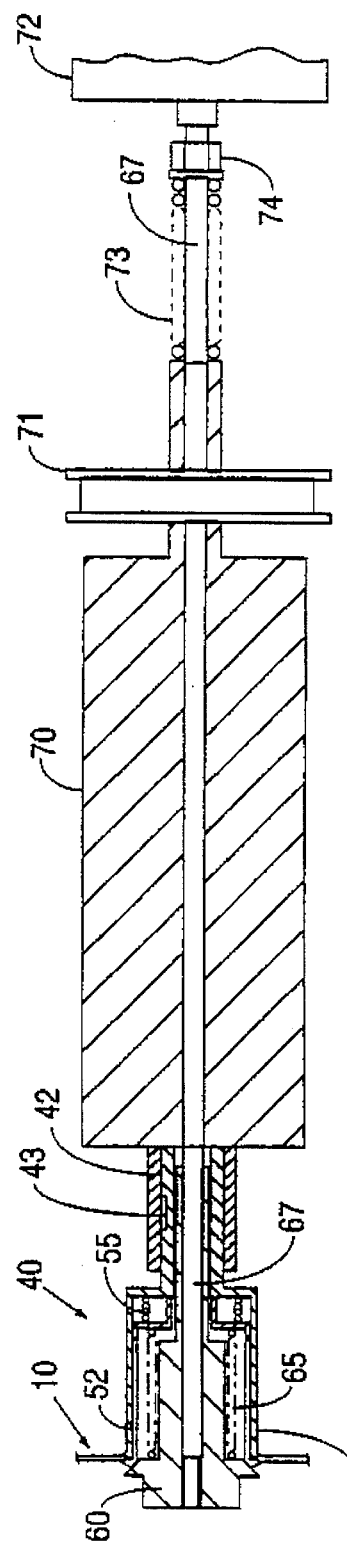

MEMORY DISK CLAMP AND METHOD

FIELD OF THE INVENTION

The present invention relates to a clamp for holding and rotating read/write memory disks. More particularly the invention is directed to a memory disk clamp and clamping method which may be used in disk manufacture and in quality control and developmental testing.

BACKGROUND OF THE INVENTION

Disks for use in computer memory storage devices, such as disk drives, have been manufactured for some years by sputtering or otherwise placing magnetic media on both sides of a disk. Disks made of aluminum or other metals and alloys, plastics, glass and ceramic have been employed. The diameter and thicknesses of the disks have become progressively smaller and thinner typically going from 130 mm to 95 mm to 65 mm to 48 mm and less in diameter and having thicknesses of 1.98 mm for a 130 mm disk to 0.38 mm for a 48 mm disk (or thinner). The aluminum disks typically are coated with a magnetic media such as 20% Co, 70% Ni and 10% Pt sputtered essentially over all of the planar surfaces of the disk, as described in U.S. Pat. No. 5,244,555. Glass disks are utilized for their superior flatness and surface hardness, the latter to resist "dings" from processing or slider impacts and resultant damage to the disk surface.

Thinner disks are desirable since, among other things, they allow the stacking of more disks in the standard height of a disk drive or an overall reduction in drive height. The resultant thinner and smaller disks have less mechanical strength and can be deformed, cracked or otherwise damaged upon being subjected to various forces.

Current technology for holding disks during certain processing steps such as burnishing and texturing and quality control and development testing has involved the use of expanding mandrels or pressurized bladders which are inserted into a central disk aperture and expanded against the inner peripheral edge of the disk, to hold and clamp the disk. The force ($F_1$) exerted by such mandrels or bladders is directed radially, that is, in a direction generally parallel to the planar surfaces of the disk. Typically, the central disk aperture is bounded by an inner cylindrical peripheral edge and chamfered surfaces connecting each of the disk's planar surfaces (sides) to that cylindrical peripheral edge. Chamfered edges also facilitate the mounting and centering of the disk on a disk drive spindle. The chamfer also minimizes stress concentrations at the aperture edges and prevents build-up of coated material at the inside diameter (ID) of the disk.

One problem in the prior art is that the force $F_1$ (shown in FIG. 1) is concentrated by the prior art clamps over a very small area of the disk aperture, namely, on less than the entire cylindrical peripheral edge which may have a width of about 60% of the thickness of the disk. The net result is that the expanding force $F_1$, applied during disk processing can easily reach a threshold level sufficient to cause deformation of the disk. This deformation includes nick marks at the disk ID and bending or warping of the disk (i.e. the disk going out of flat), and is particularly evident when the clamped disk is rotated at its typical rotation speed of about 2000 rpm or faster. The current fly heights of the read/write heads employed in modern disk drives are at a level of about 2.0 microinches (0.000051 mm).

Deformation from prior art clamping techniques can reach or exceed this height causing head crashing. Further, nick marks at the ID of the disk often result in defective assembly and uneven processing. The prior art clamps are particularly disadvantageous when glass or ceramic disks are being clamped. Glass or ceramic disks tend to have dendritic crystallized surface sites which under a sufficient and normal $F_1$ force can start disk cracking and breaking. These deformations, damages and breakages have caused relatively high and undesirable reject rates of disks undergoing processing and testing. Thus a need has arisen for the ability to clamp a disk with sufficient clamping force to undergo the necessary disk processing while minimizing the possibility of disk damage.

Furthermore, as disk drive manufacturers seek to expand the limit of the data which can be stored on magnetic disks, there is a commensurate effort to maximize the useable storage space on the disk planar sides. Therefore, in addition to controlling the force exerted on the disk so as to minimize damage during processing, it is necessary to clamp the disk for processing in such a manner so as to minimize interference with the disk planar sides and to avoid blocking the processing of any part of those planar sides.

SUMMARY OF THE INVENTION

The present invention is directed to a clamp in which forces $F_2$ and $F_3$ are applied by a clamp (as seen in FIGS. 1 and 2) on a disk's chamfered edges. The forces $F_2$ and $F_3$ are directed substantially perpendicular to the planar sides of the disk and are sufficient in magnitude to provide a frictional force between the respective chamfers which prevents slipping of the rotating disk therebetween. One advantage provided by the present invention is that the force exerted in a radial direction required to hold a disk during processing is substantially reduced. Specifically, since the forces $F_2$ and $F_3$ are applied to an inclined surface, they may be resolved into radial and perpendicular components with the radial component=$F_2 \sin \alpha \cos \alpha$, or $F_3 \sin \alpha \cos \alpha$ where $\alpha$ is the angle of inclination of the chamfered surface.

Another advantage provided by the present invention is that force applied to hold the disk during processing is applied on two surfaces of the disk. This allows increasing the surface area over which the force is applied, consequently increasing the effect the force has in resisting the disks slipping during processing. Thus, the magnitude of the force that needs to be applied to prevent disk slipping may be reduced. Our calculations indicate that $F_2$ and $F_3$ may be as low as one-third $F_1$ to achieve slip-free clamping of a disk.

An additional advantage is that the forces $F_2$ and $F_3$ are self-aligning due to the matching chamfers on the clamp portions and on the disk. There is little or no likelihood that the disk can be off-center in the overall clamp.

In a first embodiment a disk is clamped between a pair of clamping portions or clamp members each having a peripheral outer edge in the form of a chamfer which extends generally parallel to the chamfered edges of the disk aperture. The clamping members preferably are generally in the shape of a truncated cone with the chamfered edges extending radially inwardly and longitudinally outwardly from the base of the cone. The conical members are attached to or integral with a push bar or rod, one push bar being connected to a motor-driven spindle, the other being connected to a freely-rotatable spindle. The spindle motor and a housing for the freely-rotating spindle are slidable on a slide(s). A disk is moved laterally, i.e., in a direction perpendicular to the direction in which forces $F_2$ and $F_3$ are applied, to a position between the conical clamp members, and initially positioned around an entry portion of one of the members. One or both of the members and attendant push bar, spindle, motor and housing are moved via a slide such that each chamfered edge of the clamp members contacts the respective disk chamfered edges and, upon additional sliding movement of one or both of the members, clamp the disk with forces $F_2$ and $F_3$ applied in a direction generally perpendicular to the plane of the disk. Typically the chamfer angle is 45° although other angles such as 40° or 50° may also be used. Since maximum clamping pressure is exerted with maximum surface contact between the clamping members and the disk, the chamfer angle on each should be the same.

A second preferred embodiment of the invention includes a cylindrical clamp housing, having a peripheral outer edge sized and chamfered to contact a first one of the chamfered edges of the disk aperture, and which forms one of the clamp members or portions. The other clamp member or portion includes a cylindrical collet extending within a recess in the housing, the collet having a plurality of longitudinal slits which intersect one longitudinal end thereof to define a plurality of radially expandable edge segments extending from the housing. The segments have a chamfered edge thereon sized to contact a second one of the chamfered edges of the disk aperture. A pull bar mechanism is connected to an expander slidable in the collet and guided by the housing, the expander having a conical surface movable into contact with the collet, such that the collet's expandable edge segments radially expand from a first position in which the overall outside diameter of the collet is smaller than the inside diameter of the disk aperture to a second position in which the collet's expandable edge segments are substantially at the same radial position as the second one of the chamfered edges of the disk aperture. A disk may therefore be inserted over the collet, generally in a direction parallel to the direction of $F_2$ and $F_3$.

A relatively weak-in-compression expander spring is positioned between the expander and a collet base so that the pulled expander compresses the expander spring as the expander moves the collet's expandable edge segments radially outward. The inside diameter of the housing defines the maximum degree of expansion of the collet's expandable edge segments. A collet spring compressible by a spring compression force greater than that of the expander spring is positioned between the collet and the housing which acts, after the expandable edge of the collet has sufficiently expanded and contacted and seated on a second one of the chamfered edges of the disk aperture, to compress upon further movement of the pull bar and the expander being pulled into the housing. This provides a two-step clamping procedure: first, the collet's expandable edge segments are expanded from a radial position within the inside diameter of the disk aperture to a position wherein they can make surface contact with a chamfered edge of the disk (at a diameter greater than that of the inside diameter of the disk aperture); and second, the collet's expandable edge segments are compressed against the disk's chamfered edge to clamp and hold the disk. It is important in this embodiment that one end of the clamp is of a outside diameter suitable for the longitudinal presentation of a disk thereover, e.g. the diameter of collet at rest is small enough to allow a disc to be installed over the collet, such as by a robotic arm, and against the housing chamfered peripheral outer edge. In the preferred embodiment a disk may be positioned over and inserted inwardly of the expander to be guided by an entry portion of the housing outer edge and to have a chamfered edge of the disk abut a chamfered edge of the housing outer edge. Thus, there is no need to substantially displace or remove a clamp member to position a disk on or against the other clamp member. This facilitates the robotic loading of a disk into the first clamping member.

Yet another important advantage of the present invention is that the clamping members in both embodiments are designed so that there is no interference with any processing or testing equipment and/or steps on the planar surfaces of the clamped and rotating disk, i.e., the members do not extend radially to a position to block the disk's planar surfaces.

The parallel chamfered edges of the clamping portions and the chamfered edges of the disk aperture provide face-to-face contact over a majority of the disk chamfers. The only non-contact is in the second embodiment at the location of very narrow (0.2 mm) longitudinal slits in the cylindrical collet which permit the radial expansion of collet curved segments formed by the slits.

BRIEF DESCRIPTION OF THE DRAWINGS

FIG. 4 is an exploded side view of the expander, collet and housing assembly.

FIG. 5 is a cross-sectional view of the assembly of FIG. 3 showing a first pre-clamping stage of the clamp.

FIG. 6 is a cross-sectional view of the assembly of FIG. 3 showing a second collet expansion stage of the clamp.

FIG. 7 is a cross-sectional view of the assembly of FIG. 3 showing a third disk-clamping stage of the clamp.

FIG. 8 is a magnified view of the circled operative clamping portions of the clamp of FIG. 7.

FIG. 9 is a top view of the housing showing the collet spring.

FIG. 10 is a top view of the collet.

FIG. 11 is a top view of the expander.

FIG. 12 is a bottom view of the expander.

FIG. 13 is a cross-sectional view of the overall disk clamping and rotating system.

DETAILED DESCRIPTION

Figure 1:
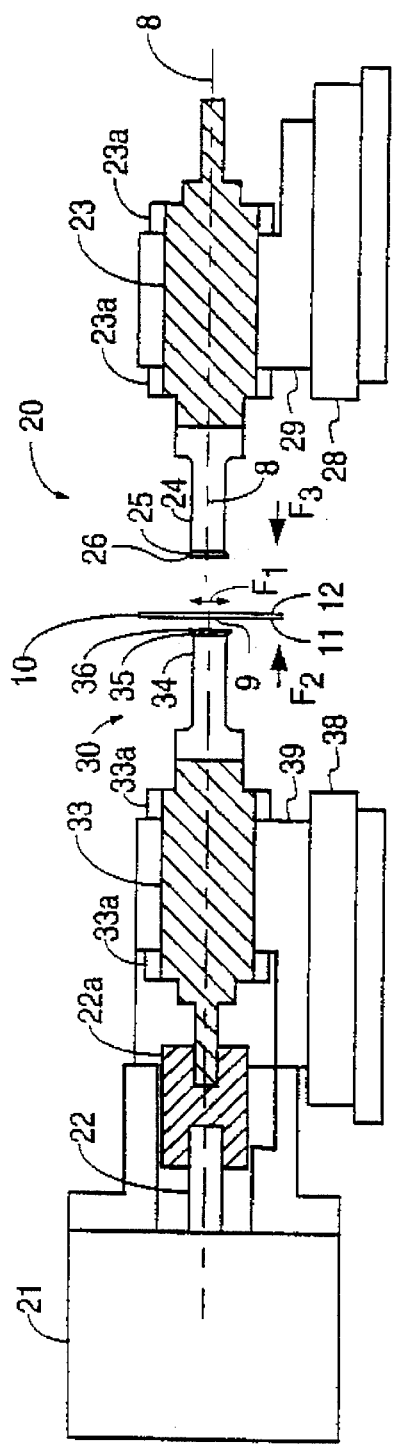
FIG. 1 is a schematic side view of a first embodiment of the clamp in a pre-clamping position.
Figure 2:
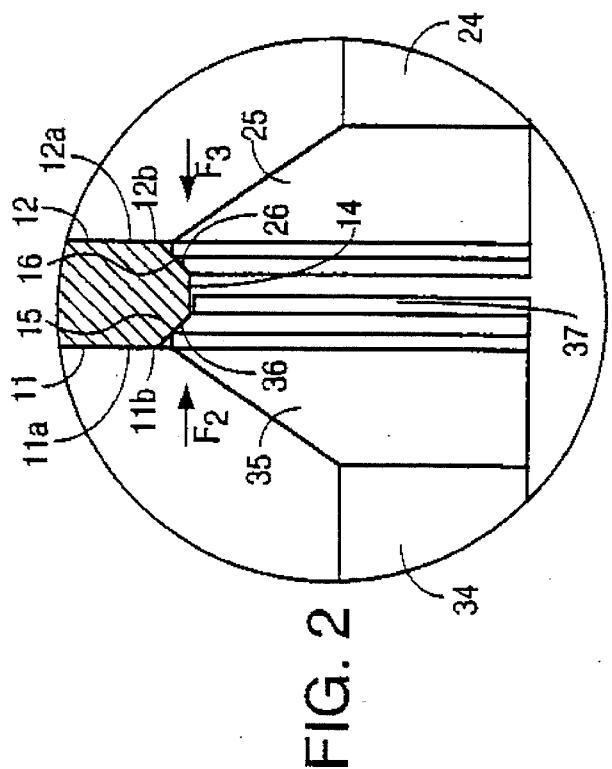
FIG. 2 is a magnified cross-sectional view of the operative portions of one segment of each of the FIG. 1 clamping members in a disk-clamping mode.

FIG. 1 schematically illustrates a first embodiment 20 of the invention wherein a prior art memory storage disk 10 is poised to be clamped between a pair of clamping portions or clamp members 25 and 35. The disk 10 has a central circular aperture 9, the aperture being bounded by a central medial cylindrical peripheral edge or ID (inside diameter) 14 and chamfered edges 15 and 16 (FIG. 2) extending respectively between planar sides 11 and 12 of the disk and the edge 14. Magnetic media 11a and 12a (FIG. 2) is sputtered or otherwise applied in layers on the planar sides of the disk extending from adjacent the disk outer periphery (not shown) to as close as possible to the disk inner periphery adjacent to the central aperture 9 at the juncture of the chamfered edges 15 and 16 with their respective planar sides 11 and 12 of the disk. This maximizes the magnetic storage area on the disk. The disk ID dimensions are a function of the disk outside diameter. The bevel or chamfer angle of chamfered edges 15 and 16 is preferably 45°±5° relative to the planar sides 11 and 12.

The clamp portions 25 and 35 each may be of cylindrical, conical or other shape and include cylindrical peripheral outer edges 26 and 36, respectively. The edges 26 and 36 are sized and provided with a bevelled or chamfered edge to contact at least a substantial portion of respective facing chamfered edges 15 and 16 of the central disk aperture 9. A short longitudinal cylindrical entry portion or stub 37 of less diameter than the disk ID and about 0.2 mm in length for one disk size, extends integrally from adjacent the radial inner edge of the chamfer 36 on clamp portion 35 for receiving and guiding the disk ID onto clamp portion 35. In clamping operations this stub is spaced from the disk ID. This is best seen in the upper half-view (not-to-scale) of FIG. 2, where clamp members 25 and 35 have been moved into a disk clamping mode of operation as indicated by the force arrows $F_3$ and $F_2$ respectively. It is to be noted that the chamfered edge 26 of the clamp member 25 is parallel to the chamfered edge 16 of the disk aperture and the chamfered edge 36 of the clamp member 35 is parallel to the chamfered edge 15 of the disk aperture.

One or both of clamp members 25 and 35 are slidable with respect to one another in order to clamp a disk therebetween. Clamp member 25 may be in the form of a conical head, with the peripheral edge 26 extending radially at a preferred angle of about 45° to the longitudinal axis 8 of the clamping assembly. This angle may range from about 30° to about 60° and preferably is chosen to correspond to the chamfer angle of the disk aperture. The clamp member 25 is fixedly connected to or integral with a rod 24 which is connected to or integral with a spindle 23 freely-rotatable in bearings 23a with respect to base 29. The base 29 is longitudinally slidable by means of a slide 28. Similarly clamp member 35 is connected to or integral with rod 34 which is connected to or integral with a spindle 33 connected by a union 22a and driven by motor shaft 22 and motor 21 or other prime mover in bearings 33a. The spindle 33 includes a base 39 slidable by means of slide 38. Alternatively spindle 33 may be fixed and only clamp member 25 subjected to sliding movement or vice versa. Similarly both of the clamp members 25 and 35 may be connected to a motor for synchronized driven rotation. The disk 10 is positioned by appropriate positioning means such as a robotic lifter (not shown) such that the disk aperture 9 is aligned with clamp members 25 and 35. One or both of the members 25 and 35 are slid towards disk 10 so that chamfered edges 26 and 36 come into touching contact with chamfered edges 15 and 16 of the disk 10. The chamfers help center the disc. When the disk is clamped with an appropriate force, motor 21 is actuatable to rotate the spindles and the clamped disk 10 for disk processing or testing operations.

Figure 3:
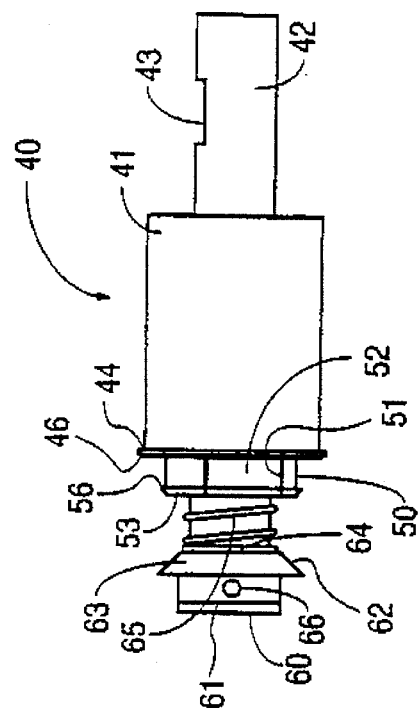
FIG. 3 is an assembled side view of the main elements of a second embodiment of the memory disk clamp in a pre-clamping stage.

In a preferred second embodiment 40 shown in FIGS. 3–13 the first clamping member, as best seen in FIGS. 3 and 4, includes a cylindrical housing 41 having a rear cylindrical extension 42 with a tangential key-way 43. The forward end of the housing 41 includes an outer lip 44 having an outwardly-facing peripheral outer edge 46 which is sized and chamfered to correspond with the size and chamfer of chamfered edge 16 of the disk aperture 9. The housing may also include a cylindrical entry portion 47 (FIG. 8) which guides entry of the disk to the clamp. The second clamp member includes a collet 50 substantially positioned within a recess 48 (FIG. 9) in housing 41. The collet has radially-expandable edges 53 each with a rearwardly-facing (toward the housing 41) chamfered edge 56. Chamfered edge 56 corresponds to edge 36 of the first embodiment and is movable into position to abut the chamfered edge 15 of the disk aperture (FIG. 8). The collet 50 includes a series of longitudinal slits 51 forming a series of curved expandable collet segments 52. To facilitate expansion, the bottom of each slit includes a semi-circular cut-out 51a (FIG. 4).

An expander 60 for radially expanding the collet segments 52 slidably extends from the collet interior. The expander 60 includes a base distal end 61, an integral inverse truncated conical collar 63 having an inverse conical surface 62 at the collar periphery. An expander spring 65 extends from a cylindrical inner truncated end 64 of collar 63 to a collet bottom 50a (FIG. 5). A pull bar 67 (FIG. 13) extends through the housing 41, the collet 50 and the expander 60, including cylindrical rear extensions 64a and 68, and is fixedly threaded and/or connected to the expander distal end 61 by a set screw (not shown) inserted into aperture 66. The large double arrow 69 of FIG. 4 shows a first step of the clamping method where a disk 10 is placed over the expander to a position on the entry portion 47 of the housing 41. The expander with its fixed conical collar is pulled by bar 67 toward the collet 50 so that conical surface 62 contacts and radially expands the collet segments 52 while compressing expander spring 65. A collet spring 55 (FIG. 4) is provided between the underside of collet 50 and the bottom of the recess 48 in the housing 41. Expander spring 65 is more easily compressed than collet spring 55. When the collar conical surface has moved in a pre-determined longitudinal distance, the collet segments have expanded sufficiently outward as indicated by arrows 58 of FIG. 4 so as to be at the same radial distance at which the chamfered edge 15 (and edge 16) of the desk aperture are located. Further expansion of the collet segments is prevented by the sides of the housing 41. Further pulling of the expander by the pull bar provides for compression of the collet spring 55 and provides the clamping forces $F_2$ and $F_3$, as indicated by the arrows in FIGS. 7 and 8. Collet spring 55 is centered under the collet 50 by cylindrical collet rear extension 57 (FIG. 4).

The housing, collet and expander are preferably made of 440 C stainless steel conventionally passivated to prevent corrosion. The expander spring 65 may be a coiled spring such as a Model C0720-055-1005, spring with a spring rate of 24 lb./in (0.43 kg/mm) available from Associated Spring Co. of Los Angeles, Calif. The spring has a free length of 25.4 mm, an OD of 15.24 mm and a wire OD of 1.4 mm. The collet spring 55 may be a multi-wave spring such as a Model GG-83 spring with a spring rate of 317.54 lb./in (5.66 Kg/mm) from Century Spring Co. of San Jose, Calif. or preferably a Model S-308 coil spring from Century Spring. The wave spring has a 7/16" (1.1 cm) free length, a 0.855" (2.17 cm) OD and a 0.092" (2.3 mm) wire OD. The housing spring 73 (FIG. 13) may be a Model S-308 spring from Century Spring with a 211 lb./in (3.77 Kg./mm) spring rate with an OD of 0.765" (19.4 mm), a 0.125" (3.1 mm) wire diameter and a 2" (5.1 cm) free length.

FIG. 5–7 illustrate the successive steps employed in the expander longitudinal movement which expands the collet segments 52 in seriatim into positions 52a, 52b and 52c, while variously compressing expander spring 65 and collet spring 55. The pull bar 67 (FIG. 13) extends through the housing rear bore 42a (FIG. 9), freely through a large opening 58a in the collet bottom 58 (FIG. 10), and through a guide bore 60a (FIG. 11) in the expander.

FIG. 5 shows the expander conical surface 62 first contacting the edges 53 of the collet 50. The inside edges 53 of collet 50 are tapered to match the taper of the expander, and thus easily expand upon coaxial motion of the expander. The collet segments are shown in position 52a with the collet peripheral chamfered edge 56 at its normal unexpanded condition still inboard of the central aperture 9 of disk 10. Spring 65 may be slightly compressed at condition 65a. The distal end of the expander is at position A. Collet spring 55 is uncompressed at condition 55a. Upon further actuation of pull bar 67 as seen in FIG. 6, the expander is moved to position B. The radially expanded collet segments 52 are then at position 52b with the chamfered surface 56 at the same radial distance as the chamfered edge 15 of the disk aperture but still spaced longitudinally therefrom. The expander spring is in a compressed condition 65b while collet spring is still essentially not compressed and still is at condition 55a.

As illustrated in FIG. 7 the pull bar 67 is further actuated to move the expander to position C. At this position the conical surface 56 contacts the chamfered edge 15 of the disk aperture and clamps the disk 10, more particularly chamfered edges 15 and 16 between the chamfered edges 46 (of housing 41) and 56 (of collet 50) with predetermined holding forces $F_2$ and $F_3$. The holding forces $F_2$ and $F_3$ are normally in the range of 3–10 Kgf. At this position C, the expander spring 65 is compressed to a final condition 65c and the collet spring 55 is compress to a final condition 55b, dependent on the desired clamping forces $F_2$ and $F_3$. As shown in the magnified FIG. 8 the chamfered surfaces 46 and 56 of the housing and collet, respectively extend over about one-half to about three quarters of the width of the chamfered edges 15 and 16 of the disk aperture. This results in having the housing and collet chamfered edge being spaced from the junction of the chamfered edges 15 and 16 with the planar sides of the chamfered disk so as not to interfere with the magnetic media on the disk planar sides. Movement of the collet segments as forced by the expander provide for self-alignment of the clamp elements since the rear end of expander 68 slides in housing extension bore 42a with a tolerance of about less than 0.001" (25.4 mm. Also, the chamfers self-center the disk when clamped.

FIGS. 9–12 are end views of the housing, collet and expander which show the bores 42a, 58a, 60a and 68a through which the pull bar or rod 67 extends.

FIG. 13 illustrates the overall system for actuating the expander 60, for clamping disc 10 and for rotating the resultant clamped disk 10 for processing, testing or other purposes. The system includes a spindle 70 with a drive pulley 71 which may be belt driven (not shown). A pull bar 67 is connected to and actuated by a push-pull air-cylinder actuator 72 such as Model No. R-158 X38 available from Compact Air of Westminster, S.C. The opposite end of the pull bar is threaded and is threaded into threads 67a in the bore 60a of the expander base 61 and locked in place by a set screw. A nut and washer combination 74 and housing spring 73 acts to force spindle 70 against the rear of housing 41. A locking key is inserted into housing keyway 43 to transmit rotation of the spindle 70 to the housing 41 and to a clamped disk.

The method of the invention involves providing first and second clamp portions each having a peripheral outer edge; positioning the disk in a position such that a disk chamfered edge is juxtaposed to an outer peripheral edge of the first clamp portions; moving an outer peripheral edge of the second clamp portion against the other chamfered edge of the disk; and exerting a force on said disk chamfered edges to clamp a disk between said outer peripheral edges, said force essentially applied transversely to a plane of the clamped disk.

The above description of embodiments of this invention is intended to be illustrative and not limiting. Other embodiments of this invention will be obvious to those skilled in the art in view of the above disclosure.

We claim:

1. A memory disk clamp for a memory disk having planar sides for receiving magnetic media on both sides of the disc, a central disk aperture, said disk aperture being bounded by a cylindrical peripheral edge and chamfered edges extending between each of said planar sides and said peripheral edge, said clamp comprising:

a first clamp portion having a first peripheral outer edge including a chamfered portion sized to contact in face-to-face contact over a majority of a first one of the chamfered edges of the disk aperture;

a second clamp portion having a second peripheral outer edge including a chamfered portion sized to contact in face-to-face contact over a majority of a second one of the chamfered edges of the disc aperture;

means for mounting the chamfered portion of the first clamp portion against a first one of the chamfered edges of the disk aperture; and means for moving and clamping the chamfered portion of the second clamp portion against a second one of the chamfered edges of the disc aperture such that the disc is clamped by forces exerted by said clamp portions essentially acting transversely to a plane of the clamped disk.

2. The memory disk clamp of claim 1 in which one of said clamp portions includes an entry portion for receiving the disk aperture and for guiding the disk into said one of said clamp portions.

3. The memory disk clamp of claim 1 wherein said first clamp portion includes a cylindrical housing including said first peripheral outer edge and said second clamp portion includes a collet substantially within said housing, said collet having a radially expandable edge forming said second peripheral outer edge.

4. The memory disk clamp of claim 3 wherein said housing includes a cylindrical recess for sliding reception of said collet; and wherein each of said housing and collet peripheral outer edges extend parallel to respective ones of the chamfered edges of the disk aperture.

5. The memory disk clamp of claim 3 further including an expander extending through said housing and said collet, said actuator including a collet expanding surface.

6. A memory disk clamp for a memory disk having planar sides for receiving magnetic media on both sides of the disc, a central disk aperture, said disk aperture being bounded by a cylindrical peripheral edge and chamfered edges extending between each of said planar sides and said peripheral edge, said clamp comprising:

a first clamp portion having a first peripheral outer edge sized to contact a first one of the chamfered edges of the disk aperture;

a second clamp portion having a second peripheral outer edge sized to contact a second one of the chamfered edges of the disc aperture;

means for mounting the first clamp portion against a first one of the chamfered edges of the disk aperture;

means for moving and clamping the second clamp portion against a second one of the chamfered edges of the disc aperture such that the disc is clamped by forces exerted by said clamp portions essentially acting transversely to a plane of the clamped disk; and wherein each of said clamp portions includes a conical head, said peripheral outer edges extending from a base of each of said conical heads and wherein at least one of said conical heads is actuatable by said means for moving and clamping.

7. The memory disk clamp of claim 6 wherein said means for moving and clamping includes at least one push rod.

8. The memory disk clamp of claim 7 wherein said clamp portions in a disk-clamped mode are rotatable to rotate a clamped disk.

9. A memory disk clamp for a memory disk having planar sides for receiving magnetic media on both sides of the disk, a central disk aperture, said disk aperture being bounded by a cylindrical peripheral edge and chamfered edges extending between each of said planar sides and said peripheral edge, said clamp comprising:

a cylindrical clamp housing having a peripheral outer edge sized and chamfered to contact in face-to-face contact over a majority of a first one of the chamfered edges of the disk aperture;

a collet substantially within said housing and having a radially expandable edge extending from the housing sized and chamfered to contact in face-to-face contact over a majority of a second one of the chamfered edges of the disk aperture; and means to expand said collet for clamping the chamfered edges of the memory disk between said housing peripheral outer edge chamfer and said collet expandable edge chamfer.

10. The memory disk clamp of claim 9 wherein said housing includes a cylindrical recess for sliding reception of said collet, said housing peripheral outer edge chamfer extending parallel to the first one of the chamfered edges of the disk aperture.

11. The memory disk clamp of claim 10 wherein said collet expandable chamfered edge extends parallel to the second one of the chamfered edges of the disk aperture.

12. The memory disk clamp of claim 9 wherein said collet further comprises a cylindrical base portion slidable in said housing and a series of longitudinal slits extending from said base to said collet expandable edge such that curved collet segments are formed between said slits, said segments terminating at said expandable edge and being radially expandable.

13. The memory disk clamp of claim 12 in which said means for expanding said collet comprises an expander slidable in said collet base.

14. The memory disk clamp of claim 13 in which said expander has an inverse conical surface movable into contact with said collet expandable edge and further movable to radially expand said collet expandable edge against the second one of the chamfered edges of the disk aperture.

15. The memory disk clamp of claim 14 including an expander spring in said collet and extending between the collet base and an expander surface adjacent to said inverse conical surface such that said expander spring is compressed upon movement of said expander to radially expand said collet; and a collet spring extending between the collet base and said housing such that said collet spring is compressed upon further movement of said expander to clampingly force said collet radially expandable edge against the second one of the chamfered edges of the disk aperture.

16. The memory disk clamp of claim 15 further comprising a pull bar extending through said housing and collet and being fixedly mounted in said expander, said bar being actuatable to pull said inverse conical surface of said expander toward the interior of said housing and collet to radially expand said collet and for compressing said springs to clamp an inserted memory disk.

17. The memory disk clamp of claim 16 further comprising an air cylinder for actuating and pulling said pull bar and a pulley fixed on said housing, said pulley being rotatable to rotate said housing, said collet, said expander and a clamped memory disk.

18. A memory disk clamp for a memory disk having planar sides for receiving magnetic media on both sides of the disk, a central disk aperture, said disk aperture being bounded by a cylindrical peripheral edge and chamfered edges extending between each of said planar sides and said peripheral edge, said clamp comprising:

a cylindrical clamp housing having a peripheral outer edge sized and chamfered to contact a first one of the chamfered edges of the disk aperture;

a collet substantially within said housing and having a radially expandable edge extending from the housing sized and chamfered to contact a second one of the chamfered edges of the disk aperture;

means to expand said collet for clamping the chamfered edges of the memory disk between said housing peripheral outer edge and said collet expandable edge; and wherein said housing includes a cylindrical recess for sliding reception of said collet, said housing peripheral outer edge extending parallel to the first one of the chamfered edges of the disk aperture; and in which said housing peripheral edge includes an entry portion extending outwardly from said housing peripheral outer edge chamfer for receiving the disk aperture and for guiding the disk against the housing peripheral outer edge.

19. A memory disk clamp for a memory disk having planar sides for receiving magnetic media on both sides of the disk, a central disk aperture, said disk aperture being bounded by a cylindrical peripheral edge and chamfered edges extending between each of said planar sides and said peripheral edge, said clamp comprising:

a cylindrical clamp housing having a peripheral outer edge sized and chamfered to contact a first one of the chamfered edges of the disk aperture;

a collet substantially within said housing and having a radially expandable edge extending from the housing sized and chamfered to contact a second one of the chamfered edges of the disk aperture;

means to expand said collet for clamping the chamfered edges of the memory disk between said housing peripheral outer edge and said collet expandable edge; and wherein said housing includes a cylindrical recess for sliding reception of said collet, said housing peripheral outer edge extending parallel to the first one of the chamfered edges of the disk aperture; and in which said housing peripheral outer edge chamfer has a width less than the width of the first one of the chamfered edges of the disk aperture such that said housing peripheral outer edge is spaced from an adjacent one of the disk planar sides.

20. A memory disk clamp for a memory disk having planar sides for receiving magnetic media on both sides of the disk, a central disk aperture, said disk aperture being bounded by a cylindrical peripheral edge and chamfered edges extending between each of said planar sides and said peripheral edge, said clamp comprising:

a cylindrical clamp housing having a peripheral outer edge sized and chamfered to contact a first one of the chamfered edges of the disk aperture;

a collet substantially within said housing and having a radially expandable edge extending from the housing sized and chamfered to contact a second one of the chamfered edges of the disk aperture;

means to expand said collet for clamping the chamfered edges of the memory disk between said housing peripheral outer edge and said collet expandable edge; and wherein said housing includes a cylindrical recess for sliding reception of said collet, said housing peripheral outer edge extending parallel to the first one of the chamfered edges of the disk aperture; and wherein said collet chamfer has a width less than the second one of the chamfered edges of the disk aperture such that the collet chamfer is spaced from an adjacent one of the disk planar sides.

21. A clamping method for a memory disk having planar sides for receiving magnetic media on both sides of the disk, a central disk aperture, said disk aperture being bounded by a cylindrical peripheral edge and chamfered edges extending between each of said planar sides and said peripheral edge, said method comprising:

providing first and second clamp portions each having a peripheral outer chamfered edge;

positioning the disk in a position such that a disk chamfered edge is adapted to be in face-to-face contact over a majority of an outer chamfered peripheral edge of the first clamp portion;

moving an outer chamfered peripheral edge of the second clamp portion into face-to-face contact over a majority of the other chamfered edge of the disk; and exerting a force on said disk chamfered edges to clamp the disk between said outer chamfered peripheral edges, said force essentially acting transversely to a plane of the clamped disk.

* * * * *